United States Patent [19]

Reed

[11] Patent Number: 5,052,490

[45] Date of Patent: Oct. 1, 1991

[54] PERMEABILITY OF FINES-CONTAINING EARTHEN FORMATIONS BY REMOVING LIQUID WATER

[75] Inventor: Marion G. Reed, Hacienda Heights, Calif.

[73] Assignee: Chevron Research Company, San Francisco, Calif.

[21] Appl. No.: 453,652

[22] Filed: Dec. 20, 1989

[51] Int. Cl.$^5$ .................... E21B 43/24; E21B 43/243
[52] U.S. Cl. ..................................... 166/303; 166/256
[58] Field of Search ................... 166/302, 59, 60, 263, 166/303, 249, 256, 257

[56] References Cited

U.S. PATENT DOCUMENTS

| | | | |
|---|---|---|---|
| 3,524,504 | 8/1970 | Allen | 166/303 |
| 3,603,396 | 9/1971 | Braun | 166/303 X |
| 3,720,263 | 3/1973 | Murphy et al. | 166/303 |
| 4,083,404 | 4/1978 | Allen | 166/303 X |
| 4,485,863 | 12/1984 | Sresty et al. | 166/248 |
| 4,524,827 | 6/1985 | Bridges et al. | 166/248 |
| 4,638,863 | 1/1987 | Wilson | 166/248 |
| 4,900,196 | 2/1990 | Bridges | 405/267 |

*Primary Examiner*—George A. Suchfield
*Attorney, Agent, or Firm*—Edward J. Keeling; Ernest A. Schaal

[57] ABSTRACT

A method is disclosed for improving the effectiveness of fluid transport in a petroleum reservoir. That method comprises increasing the permeability of a portion of the reservoir by removing liquid water from that portion by evaporating off the liquid water. Preferably, substantially all of the liquid water is removed. In one embodiment, the liquid water is evaporated off by heating the portion to a temperature above the boiling point of water for the ambient pressure of the portion. In another embodiment, the liquid water is evaporated off by injecting into the reservoir a gas (such as heated nitrogen) that is undersaturated with respect to water. In a third embodiment, steam is injected into a well within the portion, and the steam is blown down to vaporize substantially all of the liquid water and to cause the vaporized water to leave the portion. In still another embodiment, superheated steam is injected into the reservoir. Prior to the evaporation in any of those embodiments, nitrogen or natural gas can displace a fraction of the liquid water from the portion of the formation.

1 Claim, 3 Drawing Sheets

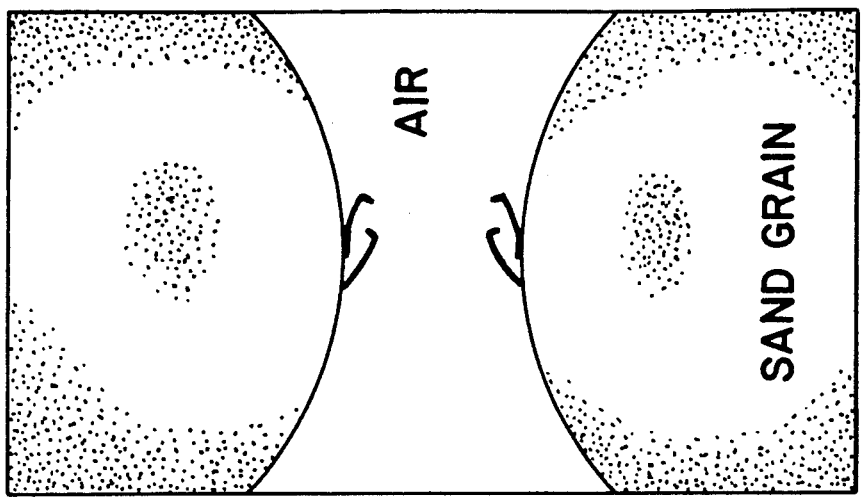
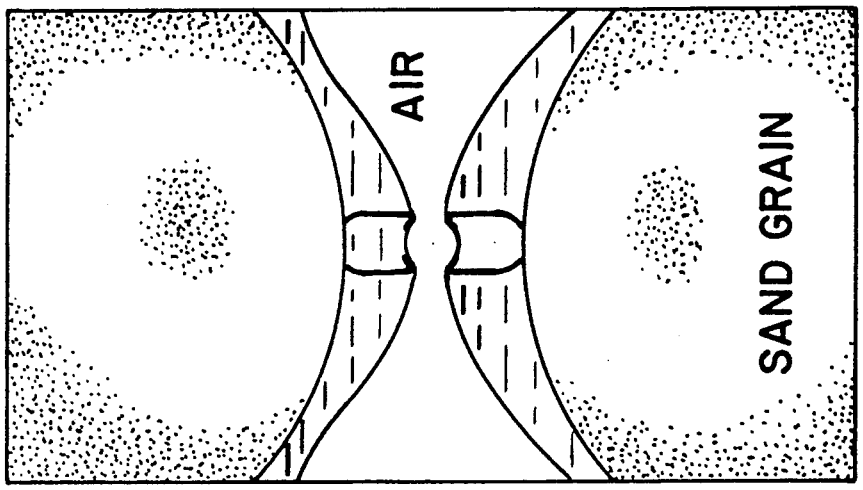
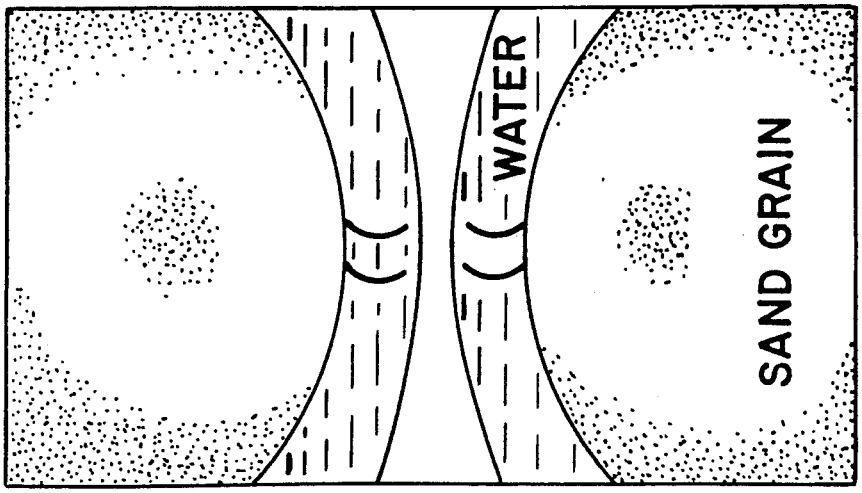
FIG_1

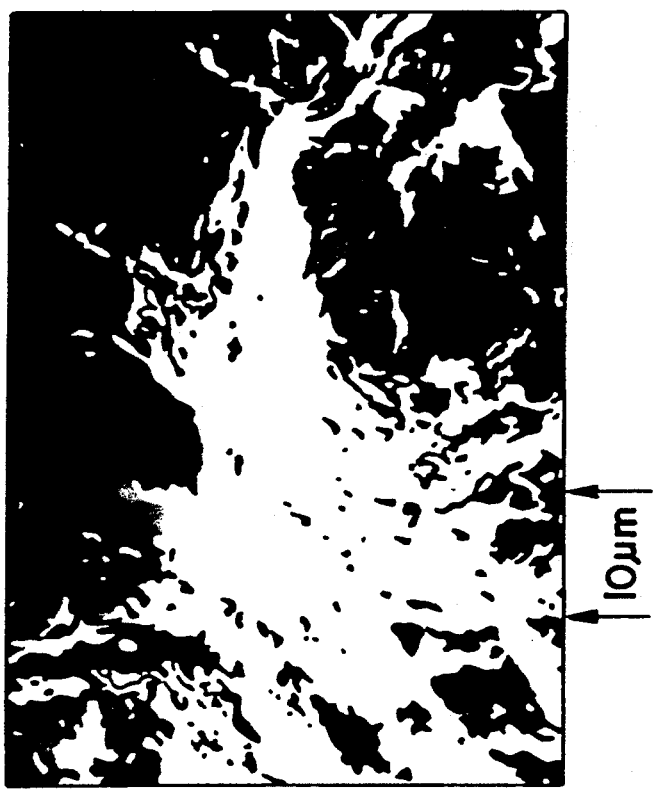
FIG_2b
AIR/WATER DRIED
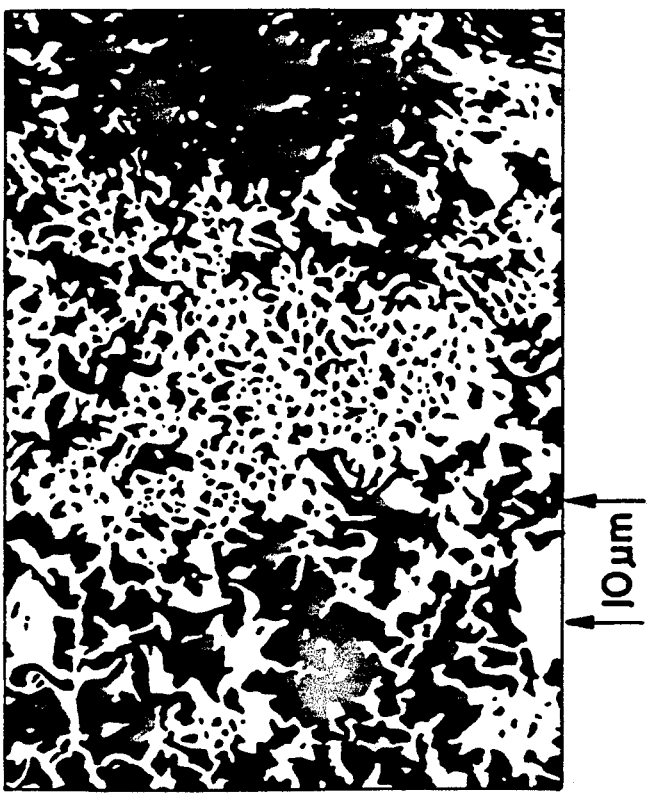
FIG_2a
CRITICAL POINT DRIED
CLAY FABRIC DISTORTION BY AIR DRYING

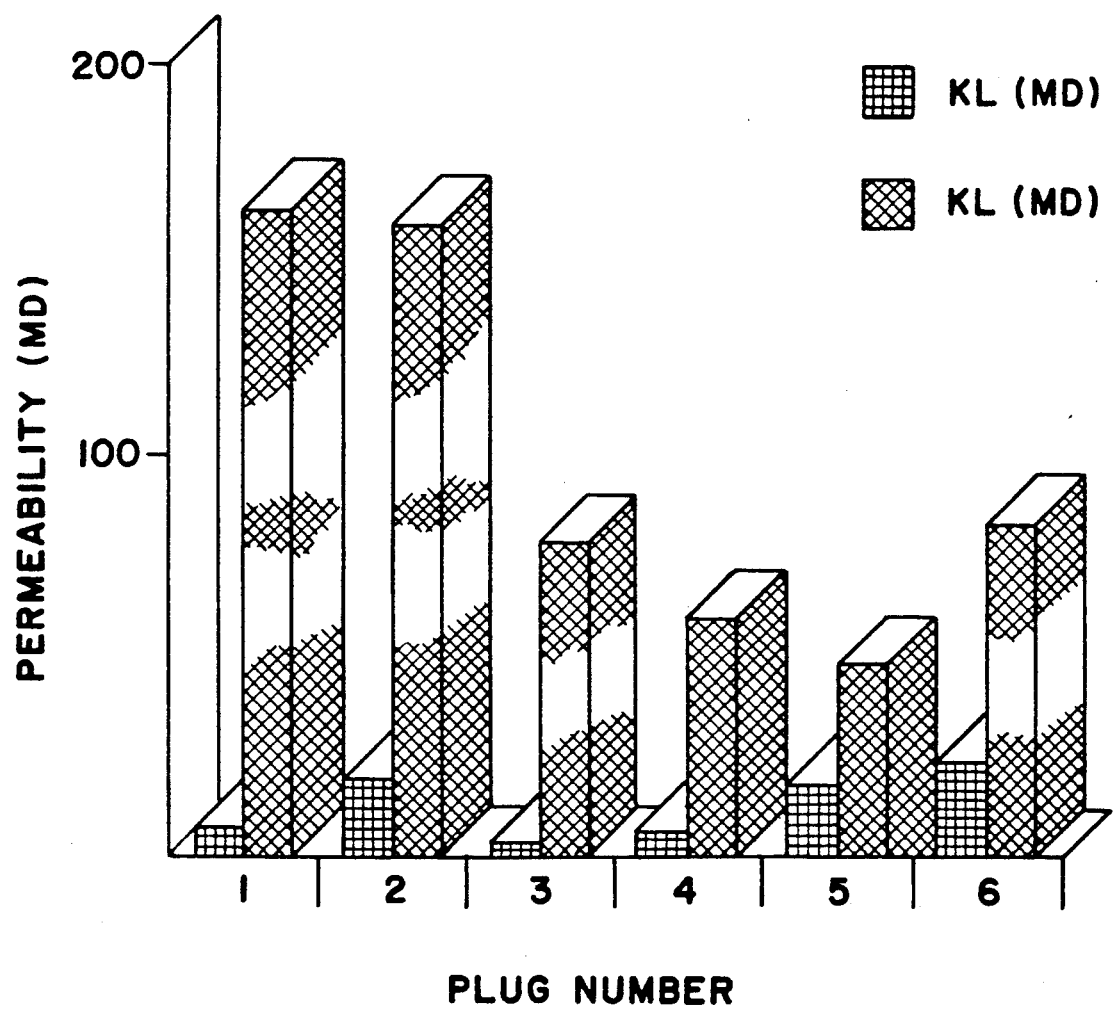
FIG_3

PERMEABILITY OF FINES-CONTAINING EARTHEN FORMATIONS BY REMOVING LIQUID WATER

The present invention relates to a method for improving the effectiveness of fluid transport in a fines-containing earthen formation.

BACKGROUND OF THE INVENTION

The effectiveness of fluid transport in an earthen formation is partly dependent upon the permeability of that formation. If that permeability can be increased, reservoir productivity and injectivity can be improved.

Previous attempts at increasing permeability of a formation have failed to stimulate the permeability beyond about a foot from the wellbore or fracture face. With the present invention, we should be able to stimulate the permeability deep into the formation.

SUMMARY OF THE INVENTION

The present invention is a method for improving the effectiveness of fluid transport in a fines-containing earthen formation by increasing the permeability of a portion of that formation (such as a portion of a petroleum reservoir). The permeability of that portion is increased by evaporating off and removing liquid water from that portion. Preferably, substantially all of the liquid water is removed.

The present invention is based, in part, upon the discovery that removing liquid water from a clayey reservoir rock by evaporating off that liquid water increases its permeability. It appears that this increase in permeability is caused by the matting down of clay particles against the rock pore walls by interfacial tension forces at the liquid/vapor phase interfaces during the late stages of the evaporation process.

In one embodiment of the present invention, the liquid water is evaporated off by heating the portion of the formation to a temperature above the boiling point of water for the ambient pressure of that portion. The portion can be heated by using, within that portion, either in situ combustion, downhole fuel fired heating, or radio frequency generation.

In another embodiment, the liquid water is evaporated off by injecting into the formation a gas (such as nitrogen) that is undersaturated with respect to water. Preferably, that gas is heated.

In another embodiment, the permeability of a portion of a formation is increased by removing liquid water from the portion by injecting superheated steam into the formation.

In still another embodiment, the liquid water is evaporated off by injecting steam into a well within the formation, and blowing down the steam to vaporize substantially all of the liquid water. The efficiency of this process increases with increasing quality of the injected steam.

Prior to any of these embodiments, a fluid that is immiscible with water may displace a fraction of the liquid water from the portion of the formation. That fluid can be a gas, such as nitrogen or natural gas.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

FIG. 1 is a schematic drawing of the observed alteration of clay fabric by drying.

FIG. 2 is a pair of scanning electron microscope photomicrographs of smectite clay showing the matting down of clay fabric by drying.

FIG. 3 is a plot of permeability effects of drying a California reservoir sand.

DETAILED DESCRIPTION OF THE PREFERRED EMBODIMENTS

In its broadest aspect, the present invention is a method for improving the effectiveness of fluid transport in a fines-containing earthen formation by increasing the permeability of a portion of that formation. That increase in permeability is achieved by removing liquid water from that portion by evaporating off the liquid water.

By "fines-containing earthen formation," we mean an earthen formation that contains clay minerals or other fine-grained minerals having particles of less than 4 micrometers in spherical equivalent diameter. By "spherical equivalent diameter," we mean the diameter of a spherical particle of the same material that would fall through a viscous medium under the force of gravity at the same rate as the particle in question. Preferably, that portion of the formation is a portion of a petroleum reservoir.

When substantially all of the liquid water is removed from the clay rock by evaporation, the clay particles appear to mat down, thereby increasing the rock's permeability. It appears that this "matting down" effect only occurs when substantially all of the water is removed. But, it is possible that, for certain reservoirs, this effect could be achieved with less than substantially all of the water being removed.

The increase in permeability is thought to be caused by the matting down of delicate clay size rock particles by the receding vapor/liquid interface during evaporation of the liquid phase as shown schematically in FIG. 1. Reservoir clays usually occur in the water phase which is normally associated with sand surfaces. Evaporation of water from the rock occurs first in the larger pores. Continued drying causes the vapor/liquid interface to move into the smaller pores and into the clay matrix. As the interface passes through the very fragile clay matrix, the clays are distorted and pulled down by the receding interface. Ultimately, much of the clay material is matted against the sand grains. This clay matting process effectively increases the size of fluid flow channels and increases permeability.

Scanning electron microscope photomicrographs in FIG. 2 show the effects of air drying on the smectite clay fabric in a California reservoir sand. Two adjacent samples of the sand were taken within a few millimeters of each other. Both samples were miscibly cleaned of oil in a way that prevents interfaces from moving through the sand. One sample was air dried in an oven at 110° C. and the other was critical point dried using liquid carbon dioxide in such a way that the liquid water was removed without passing an interface through the sand. As shown in FIG. 2, the critical point dried sample retained its delicate authigenic clay fabric but the clay fabric in the air dried sample was markedly altered. The clays appear to have been matted down against the sand grains by the high energy air/water interfaces that passed through the clay matrix during the air drying process.

The permeability effects of drying of the same California reservoir sand are shown in FIG. 3. To simulate in situ drying of the reservoir rock by steam injection and blow-down, hot liquid water at 450° F. and 800 psi pressure was passed through the cores in a high temperature permeameter. After flow and temperature were stable, the pore pressure was dropped to 50 psi to cause evaporation of the liquid water and drying of the sand. In each case, permeability to liquid water was measured immediately before and after steam blowdown. As shown in FIG. 3, permeabilities after blowdown (kf) are much higher in all cases than the permeabilities before blowdown (ki). This demonstrates the effectiveness of simulated in situ drying of a reservoir sand on stimulation of permeability.

One method of evaporating off the liquid water from a portion of the formation is by heating the portion to a temperature above the boiling point of water for the ambient pressure of that portion. This can be accomplished by a variety of ways, such as in situ combustion, downhole fuel fired heating, and radio frequency generation. Such ways are disclosed in U.S. Pat. No. 3,173,483, entitled "Control Method and System for Downhole Gas-Air Heater"; U.S. Pat. No. 3,241,615, entitled "Downhole Burner for Wells"; and U.S. Pat. No. 4,250,962, entitled "In Situ Combustion Process for the Recovery of Liquid Carbonaceous Fuels from Subterranean Formations"; which are hereby incorporated by reference for all purposes.

Another method of evaporating off the liquid water is by injecting into the formation a gas, such as nitrogen, that is undersaturated with respect to water. By "undersaturated," we mean that the gas contains less water vapor than it can contain under existing conditions. Preferably, that gas is heated prior to injection so as to increase its degree of undersaturation.

Another method of evaporating off the liquid water is by injecting steam into the portion, and blowing down the steam to vaporize substantially all of the liquid water. By "blowing down," we mean the abrupt lowing of the pressure on the steam. This abrupt lowing of the pressure causes a rapid venting of the vapor phase and conversion of the liquid phase of the water to the vapor phase. As a general rule, the efficiency of this process increases with increasing quality of the injected steam. This is because the higher quality steam contains less liquid water to evaporate.

In another embodiment, liquid water is removed from the portion of the formation by injecting superheated steam into the formation. The superheated steam both displaces some of the existing pore water from the portion and vaporizes the remaining pore water. By "superheated steam," we mean steam that has been heated beyond its saturation point at its injection pressure.

Prior to the use of any of these methods, a fluid that is immiscible with water can be used to displace a fraction of the liquid water from the portion of the formation, thereby reducing the amount of liquid water that needs to be evaporated. That fluid can be a gas, such as nitrogen or natural gas.

While the present invention has been described with reference to specific embodiments, this application is intended to cover those various changes and substitutions which may be made by those skilled in the art without departing from the spirit and scope of the appended claims.

What is claimed is:

1. A method for improving the effectiveness of fluid transport in a fines-containing earthen formation comprising increasing the permeability of a portion of said formation by removing liquid water from said portion by:
    (a) injecting steam into a well within said formation, and
    (b) abruptly lowering of the pressure on said steam to vaporize substantially all of said liquid water and to cause said vaporized water to leave said portion.

* * * * *